May 17, 1966    E. S. BARNITZ    3,251,538
METHOD OF PRODUCING VACUUM
Filed Nov. 18, 1963
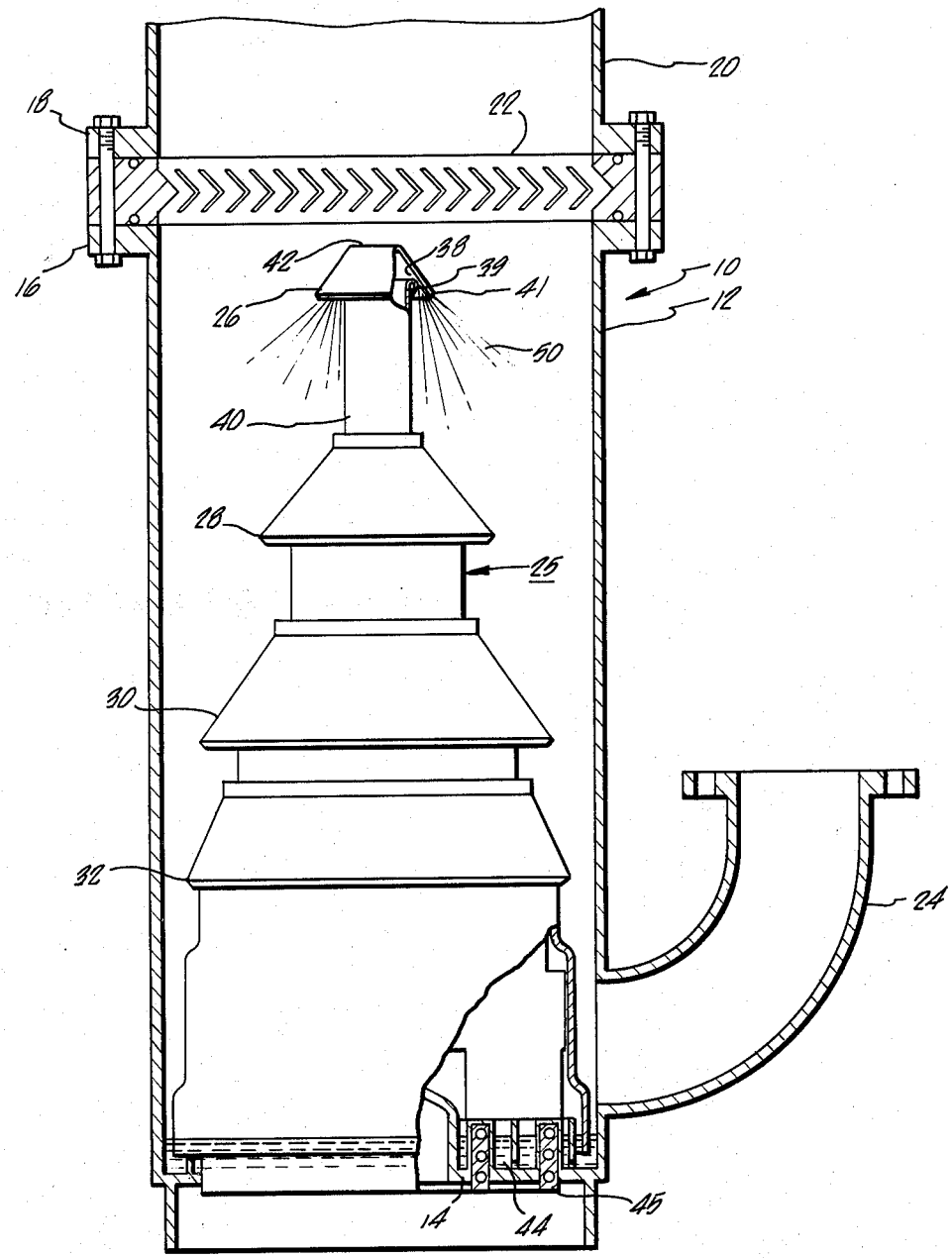
INVENTOR.
EDWARD S. BARNITZ
BY
Christie, Parker & Hale
ATTORNEYS

3,251,538
METHOD OF PRODUCING VACUUM
Edward S. Barnitz, Rochester, N.Y., assignor to Consolidated Vacuum Corporation, Rochester, N.Y., a corporation of New York
Filed Nov. 18, 1963, Ser. No. 324,197
5 Claims. (Cl. 230—101)

The present invention relates to a method for the production of vacuums and, more particularly, to a method for evacuating systems by means of vapor-actuated pump variously known as diffusion pumps, condensation pumps, and vapor booster pumps.

In vapor-actuated pumps, the action of the pump rests upon diffusion of a residual gas into a high velocity stream of vapor from a working fluid. Mercury has been used as working fluid in such pumps for many years, and continues to be used today. In addition, various high boiling organic fluids, as, for example, certain silicone oils, have gained widespread use as working fluids.

Since the relatively recent advent of high energy particle accelerators and other nuclear and atomic devices, means for producing higher vacuums have become necessary. One approach to the satisfaction of this need has been the development of new pumps which, while capable of producing the required higher vacuums, are expensive and relatively difficult to operate. Another approach has been in the direction of new working fluids that will enable existing vapor-actuated pumps to attain significantly higher degrees of vacuum.

By the method of the present invention, vacuums are produced which are at least equal to the highest heretofore attainable. Yet these vacuums are attained through use of a fluid which is relatively inexpensive and can be heated to and used at the highest boiler pressures and/or highest temperatures, so that maximum thermodynamic efficiency may be obtained.

The present invention is a method wherein a system is evacuated by means of a vacuum-actuated pump and includes the step of entraining gas in a working fluid comprising a compound selected from the family of phosphonitriles.

The pump working fluids, which I have discovered, are nitrogen bearing organic compounds and are, more particularly, aryloxy phosponitrile derivatives. Suitable polymeric aryloxy phosphonitriles can be synthesized by reaction of phosphonitrilic halide polymers with one or more monohydric phenol salts such as phenoxides, trifluoromethylphenoxides, or phenoxyphenoxides. For example, the reaction of the cyclic trimer, phosphonitrilic chloride, $(PNCl_2)_3$ with sodium phenoxide produces an oil stable to hydrolysis and resistant to thermal polymerization up to 750° F. in accordance with the following reaction:

$$(PNCl_2)_3 + 6NaOC_6H_5 \rightarrow [PN(OC_6H_5)_2]_3 + 6NaCl$$

The aryloxy phosphonitrile polymers used in the method of the present invention are particularly suitable because they possess thermal stability and good oxidation resistance. Secondarily, they have fluidity over a wide temperature range.

Examples of aryloxy phosphonitrile polymers which can be used in the practice of the method of the present invention are:

Example I
Phenoxy (phenoxyphenoxy) triphosphonitrile,

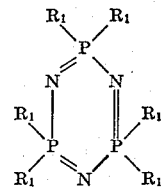

where $R_1$ represents both phenoxy and phenoxyphenoxy groups statistically distributed on the phosphonitrile ring;

Example II
Trifluoromethylphenoxy phenoxy phosphonitrile, which is a mixture of 85% of a phosphonitrile trimer derivative and 15% of a phosphonitrile tetramer derivative, these being represented as,

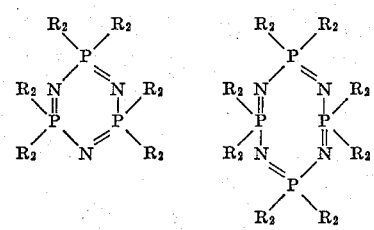

where $R_2$ represents both phenoxy and trifluoromethylphenoxy groups in a 2:1 ratio, these being statistically distributed on both phosphonitrile rings; and

Example III
Pertrifluoromethylphenoxy phosphonitrile, which is a mixture of the following,

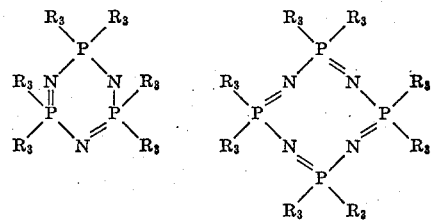

where $R_3$ represents trifluoromethylphenoxy groups.

A test with the aryloxy phosphonitrile identified as Example III above produced an ultimate vacuum of 1 to $2 \times 10^{-8}$ mm. Hg in the impure state. This compared to a vacuum of $5 \times 10^{-8}$ mm. Hg produced by impure polyphenyl ether tested under identical conditions. The cost of the aryloxy phosphonitriles in the unpurified state is only about one-fifth the cost of unpurified polyphenyl ether, the purification costs for the two materials being approximately the same. These materials compare favorably with polyphenyl ethers as to melting point, vapor pressures, and resistance to thermal decomposition and oxidation.

The ultra high vacuum compounds of this invention can be used in place of high boiling organic fluids heretofore used in conventional vapor-actuated pumps. The structure of such pumps and the principles of their operation are well known. For the purpose of illustration, the single accompanying drawing is an elevation, partially in section, showing a diffusion vacuum pump in which the method of the present invention can be practiced.

The illustrated vacuum pump 10 has a hollow cylindrical casing 12 with an intgeral bottom wall 14. The upper end of the casing 12 has an inlet flange 16 to which a cooperable flange 18 of a vessel 20 to be evacuated is secured. A baffle 22 is arranged between the flanges 16 and 18 and impedes the migration of fluid vapors into the vessel 20. The discharge side of the illustrated pump is formed by a pipe 24 which leads away from the lower end of the casing 12. In accordance with conventional practice, a fore pump (not shown) is connected to the pipe 24 to pre-evacuate the space inside casing 12 and vessel 20 when the illustrated pump is operating.

A hollow nozzle assembly 25 is located inside the pump casing 12 and includes the illustrated jet nozzles 26, 28, 30, and 32. The nozzle 26 has an orifice 38 which is formed by an upper lip 39 of a chimney 40 and a frustoconical portion 41 of a nozzle cap 42. Similar jet orifices (not shown) are formed in the nozzles 28, 30, and 32.

A pool 44 of a compound or working fluid in accordance with the subject invention is established in the casing 12 above the bottom 14. Heater elements 45 cause this pool to boil. The resulting vapors rise in the hollow nozzle assembly 25 and discharge through the nozzles 26, 28, 30, and 32, thereby entraining gas molecules in a direction away from the vessel 20 and toward the discharge pipe 24.

More specifically, some of the vapors from the pool 44 rise through the chimney 40 and discharge through the jet orifice 38 in the top nozzle 26 and form the familiar gas-entraining penumbra indicated at 50. Similar vapor discharges take place at nozzles 28, 30, and 32, so that a vigorous pumping action is provided.

I claim:

1. In a method wherein a system is evacuated by means of a vapor-actuated pump, the step of entraining gas in a working fluid consisting of aryloxy phosphonitrilic polymer.

2. In a method wherein a system is evacuated by means of a vapor-actuated pump, the step of entraining gas in a working fluid consisting of the phenoxide derivative of $(PNCl_2)_n$ polymers.

3. In a method wherein a system is evacuated by means of a vapor-actuated pump, the step of entraining gas in a working fluid comprising a compound selected from the group consisting of $[PN(C_6H_5)_2]_3$, $[PN(OC_6H_5)_2]_3$, and mixtures thereof.

4. In a method wherein a system is evacuated by means of a vapor-actuated pump, the step of entraining gas in a working fluid comprising a compound selected from the group consisting of $[PN(R)_2]_3$, $[PN(R_1R_2)]_3$, and mixtures thereof, where R is $OC_6H_5$, $R_1$ is $OC_6H_4OC_6H_5$ (paraphenoxyphenoxy), and $R_2$ is $OC_6H_4CF_3$ (trifluormethly phenoxy).

5. In a method wherein a system is evacuated by means of a vapor-actuated pump, the step of entraining gas in a working fluid comprising a compound selected from the group consisting of $[PN(C_6H_5)_2]_3$, $[PN(OC_6H_5)_2]_3$, $[PN(C_6H_5)_2]_4$, $[PN(OC_6H_5)_2]_4$, and mixtures thereof.

No references cited.

MARK NEWMAN, *Primary Examiner.*
WARREN E. COLEMAN, *Examiner.*